(12) United States Patent
Beck et al.

(10) Patent No.: US 8,600,627 B2
(45) Date of Patent: Dec. 3, 2013

(54) VIBRATION CONTROL WITH OPERATING STATE MEASUREMENT

(75) Inventors: Folker Beck, Maßweiler (DE); Lutz Bischoff, Nünschweiler (DE)

(73) Assignee: Deere & Company, Moline, IL (US)

( * ) Notice: Subject to any disclaimer, the term of this patent is extended or adjusted under 35 U.S.C. 154(b) by 1261 days.

(21) Appl. No.: 11/432,008

(22) Filed: May 11, 2006

(65) Prior Publication Data
US 2006/0276949 A1 Dec. 7, 2006

(30) Foreign Application Priority Data
May 20, 2005 (DE) .......................... 10 2005 023 256

(51) Int. Cl.
*G06F 11/00* (2006.01)
(52) U.S. Cl.
USPC .......... 701/50; 701/29.1; 701/29.2; 701/31.6; 701/31.8; 701/33.4; 701/33.7; 701/34.2
(58) Field of Classification Search
USPC ............ 701/29, 35, 36, 50, 47; 702/127, 189; 706/22, 15, 16
See application file for complete search history.

(56) References Cited

U.S. PATENT DOCUMENTS

| | | | | | |
|---|---|---|---|---|---|
| 4,386,526 | A | * | 6/1983 | Roeder ........................... | 73/587 |
| 4,415,888 | A | * | 11/1983 | van der Lely ................. | 340/684 |
| 4,574,633 | A | * | 3/1986 | Ohnuki et al. .................. | 73/587 |
| 4,720,962 | A | * | 1/1988 | Klinner ...................... | 56/10.2 R |
| 5,551,298 | A | * | 9/1996 | Rayment ......................... | 73/669 |
| 5,775,072 | A | * | 7/1998 | Herlitzius et al. ......... | 56/10.2 R |
| 5,809,152 | A | * | 9/1998 | Nakamura et al. ........... | 381/71.8 |
| 5,825,286 | A | * | 10/1998 | Coulthard ..................... | 340/447 |
| 5,893,892 | A | * | 4/1999 | Loeffler ........................ | 701/33.9 |
| 5,955,674 | A | * | 9/1999 | McGovern et al. ............. | 73/650 |
| 5,970,831 | A | * | 10/1999 | Mattinger et al. ................ | 83/13 |
| 6,004,017 | A | * | 12/1999 | Madhavan ....................... | 700/71 |
| 6,101,882 | A | * | 8/2000 | Tran et al. ....................... | 73/662 |
| 6,175,787 | B1 | * | 1/2001 | Breed .......................... | 701/29.2 |
| 6,182,018 | B1 | * | 1/2001 | Tran et al. ....................... | 702/66 |

(Continued)

FOREIGN PATENT DOCUMENTS

| | | |
|---|---|---|
| DE | 39 07 419 | 3/1989 |
| DE | 101 00 522 | 1/2001 |

(Continued)

OTHER PUBLICATIONS

European Search Report, Dated Aug. 18, 2006, 5 Pages.

*Primary Examiner* — Jonathan M Dager

(57) ABSTRACT

The invention relates to a monitoring device and to a method for monitoring the function of the components of an agricultural implement, with a vibration sensor for providing signal values containing information on mechanical vibrations generated by moving components of the implement, an operating state detecting device for providing a signal containing information on the operating state of components of the implement, and a calculating device for generating state information on the basis of the state of the components of the implement. The calculating device can be operated to divide the signal values of the vibration sensor on the basis of the corresponding signals of the operating state detecting device into different classes, which correspond to different combinations of the operating states of the components in the detection of the signal values, and to compare the signal values divided into classes or data derived from these signal values with comparison values for generating state information.

8 Claims, 2 Drawing Sheets

(56) References Cited

U.S. PATENT DOCUMENTS

| | | | |
|---|---|---|---|
| 6,266,586 B1* | 7/2001 | Gagnon | 701/31.4 |
| 6,430,903 B1* | 8/2002 | Christiansen et al. | 56/10.2 J |
| 6,507,790 B1* | 1/2003 | Radomski | 702/39 |
| 6,556,143 B2* | 4/2003 | Noah | 340/679 |
| 6,637,179 B2* | 10/2003 | Duncan | 56/10.2 J |
| 7,006,947 B2* | 2/2006 | Tryon et al. | 702/183 |
| 7,062,368 B2* | 6/2006 | Ho et al. | 701/50 |
| 7,079,982 B2* | 7/2006 | Ogura et al. | 702/185 |
| 7,392,123 B2* | 6/2008 | Heinsey et al. | 701/50 |
| 7,437,274 B2* | 10/2008 | Charette et al. | 702/184 |
| 7,739,861 B2* | 6/2010 | Mackin | 56/10.2 G |
| 2002/0107624 A1* | 8/2002 | Rutz | 701/50 |
| 2002/0107625 A1* | 8/2002 | Beck et al. | 701/50 |
| 2002/0108509 A1* | 8/2002 | Leupe et al. | 100/45 |
| 2002/0116107 A1* | 8/2002 | Mahoney et al. | 701/50 |
| 2003/0016124 A1* | 1/2003 | Schmidt et al. | 340/425.5 |
| 2003/0130766 A1* | 7/2003 | Braunhardt et al. | 701/1 |
| 2004/0015251 A1* | 1/2004 | Hamada et al. | 700/94 |
| 2005/0004737 A1* | 1/2005 | Fitzner | 701/50 |
| 2005/0096810 A1* | 5/2005 | Mahoney et al. | 701/29 |

FOREIGN PATENT DOCUMENTS

| | | |
|---|---|---|
| DE | 103 24 859 | 6/2003 |
| DE | 103 35 558 | 8/2003 |
| EP | 1 504 649 | 5/2004 |
| EP | 1 564 688 | 2/2005 |

\* cited by examiner

VIBRATION CONTROL WITH OPERATING STATE MEASUREMENT

FIELD OF THE INVENTION

The invention relates to a monitoring device and a method for monitoring the function of the components of an agricultural implement, as well as vibration sensors, detecting devices and calculating devices for generating state information.

BACKGROUND OF THE INVENTION

A monitoring device of the type named above is described in DE 101 00 522 A. The implement is equipped with several sensors for detecting vibrations generated by its components during operation. Furthermore, rotational speeds of individual components can be detected. The amplitudes and frequencies of the detected vibrations are allocated by a calculating device on the basis of the measured rotational speeds to individual components of the machine and compared with allocated comparison values. Alternatively, the vibrations are allocated to the components on the basis of their already known rotational speeds. The monitoring device enables recognition of defective components on the basis of the vibration spectrum that changes due to the defect.

However, the components of agricultural implements, especially combines, cause vibrations, which depend not only on their rotational speed and their state, but also on whether or not it is in contact with crops or other material to be processed, for example, when soil tilling or when spreading or distributing fertilizer, seed, or chemicals. This condition is to be considered when evaluating the vibration spectra. In DE 101 00 522 A, it is proposed to analyze the noise spectrum only occasionally, for example, when turning at the end of a field. However, then information is provided only over relatively short time periods, which, due to the short measurement time and the resulting uncertainty of the values Fourier-transformed into the frequency domain, is not always adequate for sufficiently error-free identification of defective components.

In DE 39 07 419 A, a method for acoustic detection of damage to a machine is described, in which the sound waves are detected only for predetermined operating conditions, such as rotational speed, stress, and temperature, and compared with predetermined limits. Here, depending on the selection of the predetermined operating conditions, only minimal amounts of data are detected.

SUMMARY OF THE INVENTION

The problem forming the basis of the invention is to provide a monitoring device and a method for monitoring for an agricultural implement, which enables the detection of an amount of data that permits reliable recognition of a possible error.

This problem is solved according to the invention by the teaching of claims 1 and 10, wherein in the other claims, features are listed, which improve the solution in an advantageous way.

The monitoring device comprises a calculating device, to which signal values from a vibration sensor and signals from an operating state sensor are supplied. The signal values of the vibration sensor contain information on mechanical vibrations caused by moving components of the implement. The signal from the operating state detection device contains information on the current operating state of components of the implement. The operating states can assume continuous numbered values (e.g., rotational speeds or rotational speed ranges or temperatures) or can also be binary information, especially whether the components are turned on or not. The operating states can also be estimated or determined on the basis of the vibration signals. It is proposed that the calculating device divide (i.e., classify) the signal values of the vibration sensor on the basis of the associated, i.e., simultaneously recorded, signal of the operating state detecting device into different classes, which correspond to different combinations of the operating states of the components. The signal values divided into the classes or data derived from these signals are compared with comparison values for generating the state information on the basis of the state of the components, in order to be able to output a corresponding warning signal in case of an error. Data derived from the signal values of the vibration sensor can be spectra Fourier-transformed to the frequency domain or information derived from these spectra or signal values compressed in the time or frequency domain, e.g., according to the MPEG standard. The analysis can be performed in the frequency domain or in the time domain. For example, the simple signal level produces the first diagnostic signal.

In this way, the signal values of the vibration sensor are detected for different, defined operating conditions and thus over sufficiently long time periods. For the analysis of signal values, the classes—which each represent operating conditions valid during the detection of the vibration signals—are taken into consideration. Therefore, the operating conditions are assembled into a series of suitable classes, for which the signal values deliver reproducible parameters, such as frequencies and amplitudes, with minimal interference, after a sufficient measurement time. The classes are defined so that the components can be easily diagnosed. The invention is suitable for any type of implement (especially agricultural), for example, harvesting machines (combines, field choppers, reaping machines, cotton pickers, including harvesting heads), machines for soil tilling, and for material spreading (fertilizer, seed, chemicals).

The signal values divided into classes can be compared with comparison values for generating the state information class-by-class or encompassing all classes. The latter means that the state information is generated on the basis of vibration sensor signals that are detected and/or had been detected at different operating states of a component and/or different combinations of the operating states of several components. A comparison over all classes is especially useful when the relevant component to be examined is in operation in both classes. In contrast, a comparison to comparison values for components not in operation is usually useful only in exceptional cases, for example, when defective or intact components output characteristic vibrations even when idle.

The operating state of a component can be determined by the operating state detecting device for at least approximately known movement frequency and/or amplitude on the basis of the signal of the vibration sensor. The calculating device also used as the operating state detecting device determines the source of a signal on the basis of the frequency and/or amplitude of a signal portion, and allocates this signal portion to the appropriate component. If difficult to detect operating states are to be classified, for which no sensors are provided (e.g., for cost reasons), modern methods of mathematics and control engineering, such as neural networks, fuzzy logic, or observers, could be used to estimate the operating states.

For example, if a straw chopper were to be provided in a combine, its operating state could be identified on the basis of the rotational speed behavior of the drive motor when turning on the threshing machine. The motors rotational speed falls greatly when the straw chopper with its moment of inertia must be accelerated. However, the magnitude of the fall in rotational speeds depends not only on the coupling state of the straw chopper, but also on the desired rotational speed, i.e., the drive ratio in the drive for the threshing cylinder and possible changes (e.g., grain leaves) to the threshing cylinder. The operating state of the straw chopper can also be determined on the basis of the analyzed vibration parameters, e.g., on the basis of the amplitude in the spectrum of a vibration sensor. If the vibration amplitude in the chopping frequency exceeds a defined threshold, then it is concluded that the straw chopper is turned on. Thus, it can identified from the vibration parameters themselves whether the drive section of the straw chopper is loaded.

In contrast, such an allocation of a vibration to a moving element is problematic if several components have approximately similar rotational speeds and/or movement amplitudes. In such a case, it has been proposed to allocate a rotational speed sensor to the component, which detects the (rotational) frequency of the element. Such rotational speed sensors are usually measured electronically for important components in modern implements. Thus, one part of the necessary information can be read from the data bus. From this information, the rotational speeds or movement frequencies of all of the preceding and subsequent moving assemblies are known via the known reduction ratios in the entire drive system. The slippage can be included in the calculation. If necessary, additional rotational speed sensors can or must be installed. The signal of the rotational speed sensor is fed to the calculating device, which allocates the signal portions of the vibration sensor to the component, with these signal portions correlating with the rotational frequency measured by the rotational speed sensor.

The calculating device can detect the signal values and the associated signals of the operating sate detecting device continuously and record them for later analysis. In contrast, to reduce the storage requirements, it has been proposed to store the signal values only when the signals of the operating state detecting device indicate that the operating conditions fall into a class that can be analyzed.

To obtain signal values from the vibration sensor, which can be converted into state information in a reproducible way by the calculating device, it is usually useful that the rotational speed of certain components generating the main vibrations in the implement lie within a predetermined tolerance range, e.g., within +/−5% from a desired rotational speed value, for the recording of signal values. It has been proposed to feed suitable information on the rotational speed of a relevant component of the implement to the calculating device, for example, information of an internal combustion engine for driving the components of the implement or a crop processing device that can be driven with variable rotational speed, e.g., a threshing cylinder or an axial separating device. The calculating device then references signal values of the vibration sensor detected over a measurement period for generating state information only when the rotational speed over the whole measurement period lies within the predetermined tolerance range. Signal values, which were detected when the rotational speeds lie outside of the tolerance range, are not taken into consideration or even not stored for later analysis. To be noted is that in another embodiment, inclusion of the rotational speed of the components in the signal values, for example, in the form of time normalization of the signal values to a desired rotational speed value, would be possible in order to be able to also take into consideration signal values recorded at different rotational speeds.

As already mentioned, the signal values of the vibration sensor are recorded in the time domain and preferably analyzed in the frequency domain, i.e., compared with desired values. The Fourier transform used for transforming the signal values from the time domain to the frequency domain requires a sufficiently long, continuous measurement period, especially at relatively low rotational speeds. Thus, the rotational speed (movement frequency) of straw rockers of a combine lies at approximately 3 Hz, which makes a measurement time on the order of magnitude of a few 10 s of seconds meaningful. It has been proposed to consider only signal values of the vibration sensor or to store these values for later analysis, which fall in a measurement period that was longer than a defined threshold.

If the implement is only relatively rarely brought by an operator or an automatic controller into an operating state that falls into a class that can be analyzed by the calculating device, only a relatively small amount of data that can be analyzed is produced, so that the identification of an error becomes difficult or impossible. Nevertheless, in order to enable an error analysis, the calculating device can automatically bring the components into a defined operating state over a sufficient time period, in which an analysis of the signal values is possible. Alternatively or additionally, a message can be output to an operator to bring components into this defined operating state. For example, a controlled run-up of the machine could be tested (manually or automatically), in that the motor rotational speed is controlled continuously from idle running to a high spinning rotational speed. This method has the advantage that damages causing resonance outside of the nominal rotational speed can be identified more easily. Similarly, the run-down could also be diagnosed: at a high spinning rotational speed, the threshing machine (or another driven element) is disengaged. Through the inertia of the work elements, it continues to run a while. The run-down behavior (run-down time and changes in the spectra) can be used for diagnosis.

BRIEF DESCRIPTION OF THE DRAWINGS

An embodiment of the invention described in more detail below is shown in the drawings. Shown are.

DESCRIPTION OF THE PREFERRED EMBODIMENT

Figure 1:
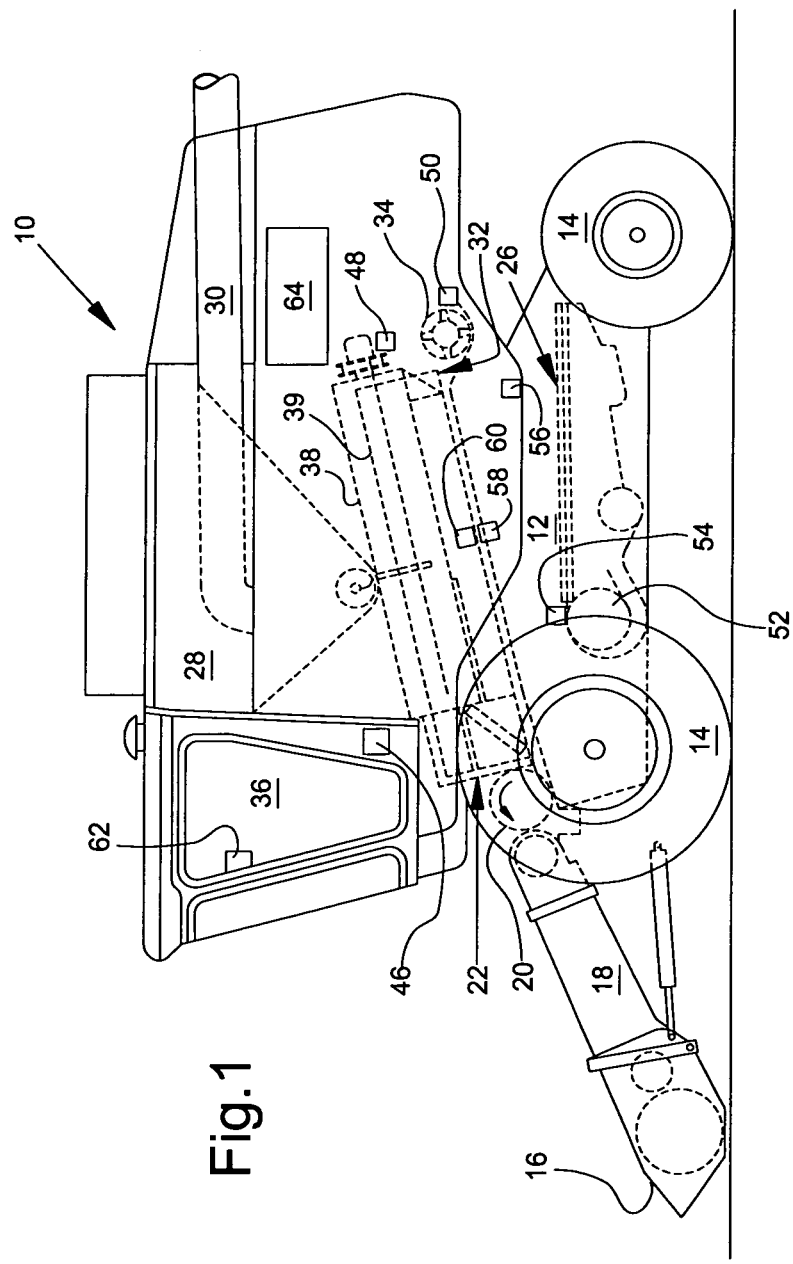
FIG. 1, a semi-schematic side view of an agricultural axial combine.

FIG. 1 shows an agricultural implement 10 in the form of a combine with a chassis 12 and ground wheels 14 extending from this chassis. The invention is explained using this example. A crop harvesting device 16 in the form of a cutting tool is used to receive crops and feed them to a slope conveyor 18. The crops are fed from the slope conveyor 18 to a guide cylinder 20. The guide cylinder 20 guides the crops upwards through an inlet transition region 22 to an axial separating device. The axial separating device comprises a cylindrical rotor housing 38 and a rotor 39 arranged in the rotor housing 38.

The axial separating device threshes and separates the harvested material. Grain and chaff fall through grates on the floor of the axial separating device into a cleaning system 26. The cleaning system 26 removes the chaff and feeds the clean grain to a (not shown) grain elevator. The grain elevator deposits the clean grain into a grain tank 28. The clean grain in the grain tank 28 can be unloaded through an unloading auger 30 into an attachment or wagon. Threshed straw freed from the grain is led out of the axial separating device through an outlet 32 to an output cylinder 34. The output cylinder 34 ejects the straw at the rear end of the implement 10.

The operation of the implement 10 is performed from a driver cabin 36. The driving components of the implement 10 are driven by an internal combustion engine 64. In the driver cabin 36, there is also a calculating device 46, which is connected to various sensors.

A vibration sensor 48 is mounted on the axial separating device and detects vibrations of the rotor housing 38. In the vicinity of the output cylinder 34, a vibration sensor 50, which detects vibrations generated by the output cylinder 34 in the parts of the chassis 12 carrying this cylinder, is mounted on the chassis 12. In the vicinity of a ventilator 52 of the cleaning device, there is a vibration sensor 54 on the chassis 12. An rotational speed sensor 58 detects the rotational speed of the rotor 39 inductively through a permanent magnet 60 mounted on the rotor 39. A vibration sensor 56 is mounted above the cleaning system 26 on the chassis 12. The vibration sensors 48, 50, 54, and 56 are known sensors, which are designed for generating signals containing information on the sound waves recorded by the vibration sensors 48, 50, 54, 56. These sensors can be especially acoustic or acceleration sensors.

Due to its position, the vibration sensor 48 provides primarily (mainly) information on the movement of the rotor housing 38 and thus vibrations generated by the rotating rotor 39. Analogously, the vibration sensor 50 provides primarily information on vibrations of the chassis 12 generated by the output cylinder 34. The vibration sensor 54 provides primarily information on the vibrations generated by the ventilator 52. The vibration sensor 56 provides information on the vibrations of the chassis, which are generated by all of the moving elements of the implement 10.

The vibration sensors 48, 50, 54, 56, and 58 are connected to the calculating device 46 electrically (or optically), preferably via a bus line. The calculating device 46 digitizes the analog signals of the vibration sensors, analyzed them, and outputs an error message to the operator in the driver cabin 36 on a display device 62, when an error of the implement 10 can be identified from the signals.

Figure 2:
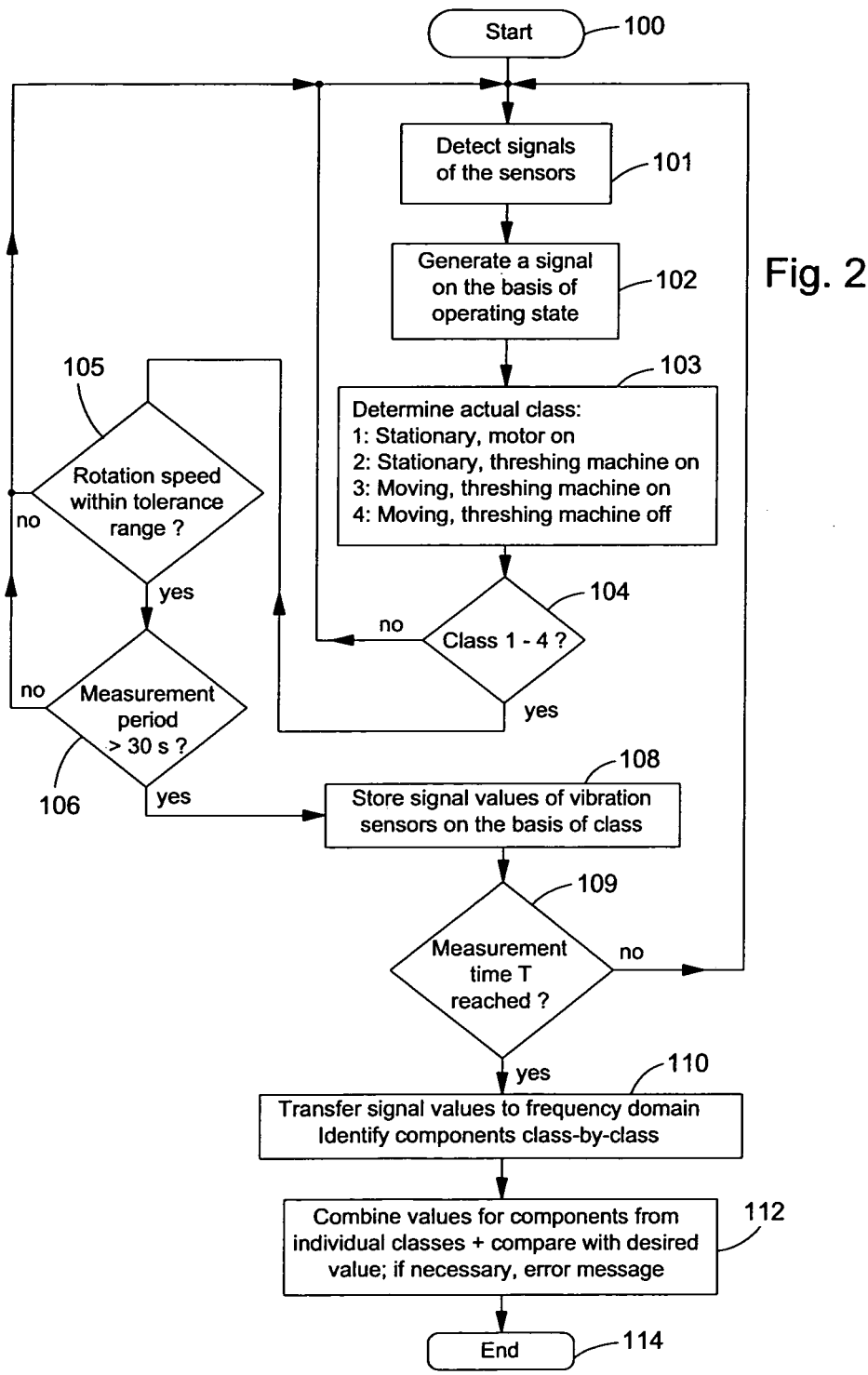
FIG. 2, a flow chart of the monitoring device of the combine.

One possible operating mode of the calculating device 46 is shown in FIG. 2. After the start in step 100, in step 101 the signals of the vibration sensors 48, 50, 54, 56, and the signals of the rotational speed sensor 58 are recorded over a certain time, for example, over 10 seconds. Here, the voltage profile of the vibration sensors 48, 50, 54, 56, and signals delivered to the rotational speed sensor 58 from the calculating device 46 is stored as a function of time.

In the subsequent step 102, a signal is generated by the calculating device 46 regarding the operating state of the components of the implement 10 on the basis of the signal of the rotational speed sensor 58 and the vibration sensors 48, 50, 54, and 56. From the value of the rotational speed sensor 58, it can be identified whether the rotor 39 is turning or not. The vibration sensor 56 delivers different signals when the drive motor 64 is in operation than when it is turned off, because the vibrations generated by the drive motor 64 are transmitted to it via the chassis 12. Thus, the operating state of the drive motor 62 can be identified on the basis of the signals of the vibration sensor 56. While moving, the hydraulic motors used for driving the driving wheels 14 also generate specific vibrations, which are detected by the vibration sensor 56. Alternatively, the current forward speed is detected by a suitable sensor, which measures the rotational speed of a wheel 14 or the ground speed with radar or a GPS antenna. On the basis of the signal of the vibration sensor 50, it can be identified whether the output cylinder 34 is conveying crops. Consequently, the calculating device 46—here functioning as part of an operating state detecting device—can deliver in step 104 a signal regarding the operating state of several components of the implement 10. It provides a signal that contains, among other things, information on whether the drive motor 64 is running, whether the implement 10 is moving or stationary, whether the threshing machine is in operation with the rotor 39, and whether crops are passing through the implement 10.

On the basis of this signal, the calculating device 46 determines in the following step 104 a relevant class of the operating state of the components. In the shown embodiment, four classes are differentiated:

1. The implement 10 is stationary, the drive motor 64 is in operation.
2. The implement 10 is stationary, the threshing machine is turned on.
3. The implement 10 is moving, the threshing machine is turned on, but there is no crop throughput.
4. The implement 10 is moving, the threshing machine is turned off.

It would also be conceivable to introduce other classes. It is to be emphasized that there is no class for a implement 10 charged with crops. The reason is that crops damp the vibrations of the components and make the identification of errors more difficult. However, in another embodiment, a class can also be allocated to a harvesting process.

In the following step 104, if the operating state does not correspond to the classes, no signal value is stored, but instead control continues with step 101. Otherwise, the step 105 follows, in which it is queried whether the rotational speed of the internal combustion engine 64 and the axial separating device lay within suitable tolerance ranges during the entire previous measurement time. The rotational speeds are provided to the calculating device 46 by the rotational speed sensor 48 for the axial separating device and by the vibration sensor 56 for the internal combustion engine 64 (or by its engine controller). If the result of step 105 is negative, then step 101 is repeated, in which the measurement starts over, otherwise the step 106 follows.

In step 106, it is queried whether the previous measurement time is greater than 30 s. If this is not the case, step 101 follows, in order to lengthen the measurement time. In the otherwise following step 108, the signal values previously collected during the execution of step 101 from the vibration sensors 48, 50, 54, 56 are stored in connection with information on the relevant class. Step 109 follows, in which it is queried whether there is sufficient measurement time T for the data recording, which can equal, for example, at least 10 min for each class. If this is not the case, step 101 is repeated; otherwise step 110 follows, in which the signal values are subjected to a Fourier transform, i.e., transformed to the frequency domain.

In addition, in step 110, the detected vibrations are allocated to the individual components. This allocation can be performed on the basis of measured rotational speeds (e.g., rotational speed sensor 58 for the rotor 39) or on the basis of known positions of the vibration frequencies. This allocation is performed separately for each class.

In the next step 112, values of the components are combined with each other from the individual classes. Here, for example, the amplitudes of fundamental and harmonic oscillations and the position of maximum values can be analyzed (see DE 101 00 522 A, whose contents are incorporated by reference into the present document). The individual values can be weighted and summed depending on the relevant class or combined in some other way. Finally, they are compared with a desired value. If the desired value exceeds a certain measure, an error message is displayed on the display device 62. The Fourier transform into the frequency domain is only one example for an analysis of the vibration signals, because an analysis can also be performed in the time domain (see DE 103 35 558 B, whose disclosure is incorporated through reference into the present document). The process then ends in step 114, at which step 100 at be repeated.

In conclusion, the monitoring device constructed from the vibration sensors 48, 50, 52, 54, the rotational speed sensor 58, and the calculating device 46 enables simple monitoring of the implement 10 for elements not moving as expected and thus early detection of possible errors.

Having described the preferred embodiment, it will become apparent that various modifications can be made without departing from the scope of the invention as defined in the accompanying claims.

The invention claimed is:

1. A monitoring device for monitoring the function of components of an agricultural implement, comprising:
a vibration sensor configured to provide signal values containing information on mechanical vibrations generated by moving components of the implement;
an operating state detecting device configured to generate a signal containing information on the operating state of components of the implement; and
a calculating device configured to generate state information of the state of the components of the implement, which is based on the signal values of the operating state detecting device and the vibration sensor, the calculating device being configured to divide the signal values of the vibration sensor into various classes on the basis of the corresponding signals of the operating state detecting device, which correspond to different combinations of the operating states of the components when signal values are detected, the calculating device being further configured to compare the signal values divided into the classes or data derived from these values with comparison values for generating the state information, wherein the calculating device is configured to selectively store signal values of the vibration sensor for subsequent use by said calculating device in determining said state information, said storing occurring only when the calculating device determines that the signals of the operating state detecting device indicate that the operating conditions during which the signals of the vibration sensor were gathered fall into a class of said various classes that can be analyzed.

2. The monitoring device according to claim 1, wherein the calculating device is further configured to compare the signal values divided into classes with comparison values for generating the state information class-by-class or over all classes.

3. The monitoring device according to claim 1, wherein the operating state detecting device is further configured to identify whether a component of the implement is in an operating state, and the calculating device is further configured to generate state information only for components for which the operating state detecting device signals an operating state.

4. The monitoring device according to claim 1, wherein the operating state detecting device is further configured to derive the operating state of a component from the signal of the vibration sensor and/or to determine the operating state on the basis of a sensor allocated to the components and/or an input element allocated to the components.

5. The monitoring device according to claim 1, wherein information on the rotational speed or the movement frequency of at least one moving component of the implement, including at least one of an internal combustion engine and/or a crop processing device is fed to the calculating device, the calculating device being further configured to reference signal values of the vibration sensors detected over a measurement period only when the rotational speed is within a tolerance range during the entire measurement period.

6. The monitoring device according to claim 1, wherein the calculating device is further configured to reference signal values of the vibration sensor detected over a measurement period for analysis only when the length of a continuous measurement period is above a certain threshold.

7. The monitoring device according to claim 1, wherein the calculating device is further configured to bring components into a defined operating state and/or to give instructions to an operator for bringing components into a defined operating state.

8. A method for monitoring the function of the components of an agricultural implement, comprising the steps of:
providing signal values of a vibration sensor containing information on mechanical vibrations generated by moving components of the implement;
providing a signal to an operating state detecting device, which contains information on the operating state of components of the implement; and
generating state information on the basis of the state of the components of the implement with a calculating device, with this information being based on the signal values of the operating state detecting device and the vibration sensor;
wherein the calculating device divides the signal values of the vibration sensors into different classes on the basis of the corresponding signals of the operating state detecting device, which correspond to different combinations of the operating states of the components in the detection of the signal values, the calculating device comparing the signal values divided into classes or data derived from these values with comparison values for generating state information, wherein the calculating device is configured to selectively store signal values of the vibration sensor for subsequent use by said calculating device in determining said state information, said storing occurring only when the calculating device determines that the signals of the operating state detecting device indicate that the operating conditions during which the signals of the vibration sensor were gathered fall into a class of said different classes that can be analyzed.

* * * * *